(12) United States Patent
Tell et al.

(10) Patent No.: US 7,567,935 B2
(45) Date of Patent: Jul. 28, 2009

(54) SHORT TRADE INFORMATION SYSTEM

(75) Inventors: Martin Tell, New York, NY (US); Darin DeMizio, Staten Island, NY (US); Darilyn Olidge, South Orange, NJ (US); Scott Rockoff, Warren, NJ (US)

(73) Assignee: Morgan Stanley, New York, NY (US)

( * ) Notice: Subject to any disclaimer, the term of this patent is extended or adjusted under 35 U.S.C. 154(b) by 0 days.

(21) Appl. No.: 10/243,371

(22) Filed: Sep. 13, 2002

(65) Prior Publication Data
US 2004/0054614 A1    Mar. 18, 2004

(51) Int. Cl.
*G06Q 40/00* (2006.01)
(52) U.S. Cl. .............................. 705/37; 705/38; 705/36; 705/5
(58) Field of Classification Search ................... 705/37, 705/36, 38, 34, 35, 5
See application file for complete search history.

(56) References Cited

U.S. PATENT DOCUMENTS

| | | | | |
|---|---|---|---|---|
| 5,101,353 A | * | 3/1992 | Lupien et al. ................. | 705/37 |
| 6,014,643 A | * | 1/2000 | Minton ......................... | 705/37 |
| 6,505,174 B1 | * | 1/2003 | Keiser et al. .................. | 705/37 |
| 6,513,019 B2 | * | 1/2003 | Lewis ........................... | 705/35 |
| 6,515,681 B1 | * | 2/2003 | Knight ......................... | 345/751 |
| 6,516,303 B1 | * | 2/2003 | Wallman ...................... | 705/36 |
| 6,564,191 B1 | * | 5/2003 | Reddy .......................... | 705/36 |

OTHER PUBLICATIONS

The Journal of Finance vol. 53, Dec. 1998.*
Chun Wah Lee. The Journal of Product and Brand Management. Santa Barbara: 2002. vol. 11, Iss. 2/3; p. 103, 12 pgs).*
M. Aitken et al., "Short Sales Are Instantaneously Bad News: Evidence from the Australian Stock Exchange", *The Journal of Finance*, vol. 53, No. 6, Dec. 1998.
Hermand Desai et al., "An Investigation of the Informational Role of Short Interest in the Nasdaq Market", 2002.

* cited by examiner

*Primary Examiner*—Frantzy Poinvil
*Assistant Examiner*—Clement Grahem
(74) *Attorney, Agent, or Firm*—Isabel Cantallops; Clifford Chance US LLP

(57) ABSTRACT

A method is provided for presenting short-sale information associated with a plurality of securities and includes the steps of receiving the short-sale information from at least one source; filtering the short-sale information and presenting the filtered short-sale information according to at least one display criteria.

35 Claims, 13 Drawing Sheets

Short Balances

Account: [XYZ]  Short Bal.: 10 %

| Cusip | Symbol | Ind | Price | Description | Sector | Pend. Shares | Acct Shares | 6/24/02 | 7/02/02 | % Chg |
|---|---|---|---|---|---|---|---|---|---|---|
| 714265105 | PER | H | 9.50 | PEROT SYSTEMS CORP | IT Consulting & Ser... | 121,814 | 43,800 | 1,090,284 | 2,058,536 | 89.72% |
| 370442832 | GMH | C | 10.62 | GENERAL MOTORS | Broadcasting & Ca... | 445,900 | 632,000 | 2,077,793 | 3,238,409 | 55.85% |
| 14067E506 | CMO | W | 22.19 | CAPSTEAD MORTGAGE | Real Estate Invest... | 8,400 | 6,000 | 29,761 | 41,058 | 37.95% |
| 149123101 | CAT | C | 48.00 | CATERPILLAR INC | Construction & Far... | 442,922 | 49,000 | 882,212 | 1,208,071 | 36.93% |
| 025537101 | AEP | C | 39.59 | AMER ELEC PWR INC | Electric Utilities | 284,049 | 1,087,000 | 1,804,485 | 2,462,869 | 36.48% |
| 244199105 | DE | C | 48.08 | DEERE & CO COM | Construction & Far... | 545,622 | 750,000 | 2,521,319 | 3,382,564 | 34.16% |
| 364730101 | GCI | C | 74.75 | GANNETT INC COM | Publishing | 173,686 | 161,500 | 318,857 | 420,833 | 31.98% |
| 71654V408 | PBR | W | 18.09 | PETROLEO BRASIL | Integrated Oil & Gas | 155,900 | 271,100 | 1,073,721 | 1,389,221 | 29.38% |
| 315616102 | FFIV | H | 8.98 | F5 NETWORKS INC | Internet Software &... | 196,890 | 23,800 | 691,703 | 893,347 | 29.15% |
| 872443403 | THQI | C | 27.32 | T·HQ INC | Application Software | 1,009,303 | 778,500 | 2,401,020 | 2,922,072 | 21.70% |
| 264399106 | DUK | C | 30.36 | DUKE ENERGY CORP | Multi-Utilities & Unr... | 1,134,479 | 610,000 | 3,915,522 | 4,616,784 | 17.90% |
| 269151106 | ESST | S | 16.61 | ESS TECHNOLOGY INC | Semiconductors | 305,339 | 672,900 | 2,705,538 | 3,152,280 | 16.51% |
| 92343E102 | VRSN | W | 6.92 | VERISIGN INC | Internet Software &... | 692,237 | 70,500 | 2,035,658 | 2,367,817 | 16.31% |
| 767754104 | RAD | H | 2.44 | RITE AID CORPORATI... | Drug Retail | 677,900 | 4,861,700 | 5,235,581 | 5,968,581 | 14.00% |
| 594793101 | MCRL | C | 14.00 | MICREL INC | Semiconductors | 175,087 | 310,000 | 1,568,894 | 1,782,948 | 13.64% |
| 984332106 | YHOO | C | 13.63 | YAHOO INC | Internet Software &... | 3,494,879 | 2,064,100 | 8,214,779 | 9,318,475 | 13.43% |
| 302182100 | ESRX | C | 47.18 | EXPRESS SCRIPTS INC | Health Care Distrib... | 360,216 | 305,200 | 2,244,893 | 2,526,404 | 12.54% |
| 14149Y108 | CAH | C | 57.30 | CARDINAL HEALTH INC | Health Care Distrib... | 480,261 | 172,500 | 1,998,391 | 2,247,874 | 12.48% |
| 059460204 | BBD | H | 19.40 | BANCO BRADESCO | Banks | 24,900 | 863,000 | 974,986 | 1,087,466 | 11.53% |
| 35138T107 | FOX | C | 21.05 | FOX ENTERTAINMENT | Movies & Entertain... | 38,400 | 345,000 | 1,377,794 | 1,534,783 | 11.39% |
| 046353108 | AZN | C | 40.00 | ASTRAZENECA PLC | Pharmaceuticals | 575,175 | 286,600 | 4,959,296 | 5,464,140 | 10.17% |
| 25746U109 | D | C | 65.19 | DOMINION RES INC | Electric Utilities | 309,428 | 402,400 | 2,095,793 | 2,306,506 | 10.05% |

Indicator: SuperHot, Hot, Dividend, Warm, Cold, All

Aggregate Short Balance · Shares

Sector Breakdowns

| Industry | 5 Day Pending Shorts Activity | | Settled Shorts | | Pen1 | | Pen2 | |
|---|---|---|---|---|---|---|---|---|
| | Mkt Val | % MV | Mkt Val | % MV | Mkt Val | % MV | Mkt Val | % MV |
| Semiconductors | 426,028,528 | 6.97% | 2,280,477,059 | 4.79% | 54,993,544 | 4.03% | 56,957,827 | 4.85% |
| Semiconductor Equipment | 291,182,600 | 4.76% | 1,332,746,258 | 2.80% | 81,261,303 | 5.95% | 20,973,440 | 1.79% |
| Biotechnology | 290,503,471 | 4.75% | 2,095,262,843 | 4.40% | 33,384,227 | 2.45% | 49,307,868 | 4.20% |
| Broadcasting & Cable TV | 268,332,450 | 4.39% | 847,794,051 | 1.78% | 24,020,497 | 1.76% | 42,033,384 | 3.58% |
| Pharmaceuticals | 261,106,245 | 4.27% | 2,060,894,964 | 4.32% | 77,831,591 | 5.70% | 64,169,852 | 5.46% |
| Systems Software | 250,943,659 | 4.11% | 962,747,854 | 2.02% | 51,262,851 | 3.75% | 27,622,580 | 2.35% |
| Application Software | 230,694,268 | 3.78% | 1,398,548,156 | 2.93% | 68,353,980 | 5.01% | 74,669,709 | 6.36% |
| Diversified Financial Ser | 197,015,625 | 3.22% | 1,459,485,804 | 3.06% | 44,525,823 | 3.26% | 21,921,353 | 1.87% |
| Banks | 175,906,268 | 2.88% | 1,889,326,505 | 3.96% | 45,262,841 | 3.32% | 38,115,282 | 3.24% |
| Computer Hardware | 165,841,061 | 2.71% | 742,527,779 | 1.56% | 44,526,648 | 3.26% | 16,579,191 | 1.41% |
| Automobile Manufacturers | 151,982,373 | 2.49% | 788,869,831 | 1.66% | 19,411,785 | 1.42% | 26,193,714 | 2.23% |
| Integrated Telecommunicat | 139,878,034 | 2.29% | 882,029,137 | 1.85% | 21,172,449 | 1.55% | 26,075,212 | 2.22% |
| Health Care Distributors | 137,580,229 | 2.25% | 1,312,722,490 | 2.75% | 41,862,109 | 3.07% | 41,508,458 | 3.53% |
| IT Consulting & Services | 133,581,294 | 2.19% | 705,525,904 | 1.49% | 30,702,697 | 2.25% | 19,429,920 | 1.65% |
| Telecommunications Equipm | 132,442,253 | 2.17% | 1,176,600,282 | 2.47% | 23,354,037 | 1.71% | 24,125,160 | 2.05% |
| Aerospace & Defense | 125,596,253 | 2.06% | 635,576,934 | 1.33% | 29,158,518 | 2.14% | 27,441,614 | 2.34% |
| Advertising | 114,682,820 | 1.88% | 336,522,962 | 0.71% | 16,604,008 | 1.22% | 13,626,851 | 1.16% |
| Internet Software & Servi | 112,929,863 | 1.85% | 823,893,058 | 1.73% | 24,323,135 | 1.78% | 11,631,695 | 0.99% |
| Managed Health Care | 109,976,753 | 1.80% | 479,518,690 | 1.01% | 22,569,823 | 1.65% | 15,526,842 | 1.32% |
| Homebuilding | 97,849,506 | 1.60% | 423,423,347 | 0.89% | 9,756,703 | 0.72% | 8,129,745 | 0.69% |
| Data Processing Services | 95,116,846 | 1.55% | 639,392,219 | 1.34% | 30,663,862 | 2.25% | 13,892,280 | 1.18% |
| Industrial Conglomerates | 93,708,662 | 1.53% | 280,955,417 | 0.59% | 28,118,805 | 2.06% | 12,143,179 | 1.03% |
| Electronic Equipment & In | 81,073,589 | 1.33% | 747,246,881 | 1.57% | 21,451,506 | 1.57% | 15,414,406 | 1.31% |

Market Color

File Edit View Tools Help

General Shorts

| Industry |
|---|
| Semiconductors |
| Semiconductor Equipm |
| Biotechnology |
| Broadcasting & Cable T |
| Pharmaceuticals |
| Systems Software |
| Application Software |
| Diversified Financial Se |
| Banks |
| Computer Hardware |
| Automobile Manufactur |
| Integrated Telecommur |
| Health Care Distributors |
| IT Consulting & Service |
| Telecommunications Ec |
| Aerospace & Defense |
| Advertising |
| Internet Software & Ser |
| Managed Health Care |
| Homebuilding |
| Data Processing Services |
| Industrial Conglomerates |
| Electronic Equipment & In |

Sector Details
Semiconductor Equipment
5 Day Short Activity

| Cusip | Symbol | Ind | Description | Shares | Mkt Val |
|---|---|---|---|---|---|
| 482480100 | KLAC | W | KLA-TENCOR CORP | 2,650,513 | 109,519,197 |
| 038222105 | AMAT | C | APPLIED MATERIALS | 4,137,139 | 74,592,616 |
| 670008101 | NVLS | W | NOVELLUS SYSTEMS INC | 1,264,951 | 40,642,875 |
| 922207105 | VSEA | C | VARIAN SEMICONDUCTOR | 529,777 | 17,164,774 |
| 12709P103 | CCMP | H | CABOT | 362,271 | 14,914,697 |
| 225502108 | CMOS | C | CREDENCE SYS CORP | 856,500 | 14,200,770 |
| 512807108 | LRCX | C | LAM RESH CORP | 600,185 | 10,119,119 |
| 880770102 | TER | C | TERADYNE INC | 209,255 | 4,687,312 |
| 781270103 | RTEC | W | RUDOLPH | 93,750 | 2,169,375 |
| 30241L109 | FEIC | C | FEICO | 61,298 | 1,429,243 |
| 00207R101 | ATMI | W | ATMI INC | 45,632 | 956,728 |
| 423319102 | HELX | C | HELIX TECHNOLOGY | 21,466 | 409,234 |
| 501242101 | KLIC | W | KULICKE & SOFFA INDS | 19,284 | 221,380 |
| | | | Totals | 10,881,941 | 291,182,800 |

| | | | | | |
|---|---|---|---|---|---|
| 97,849,506 | | 1.60% | 423,423,347 | 0.89% | 0.72% |
| 95,116,846 | | 1.56% | 639,392,219 | 1.34% | 2.25% |
| 93,708,662 | | 1.53% | 280,955,417 | 0.59% | 2.06% |
| 81,073,589 | | 1.33% | 747,246,881 | 1.57% | 1.57% |

| | MktVal | Pen2 | %MV |
|---|---|---|---|
| | 56,957,827 | | 4.85% |
| | 20,973,440 | | 1.79% |
| | 49,307,868 | | 4.20% |
| | 42,033,384 | | 3.58% |
| | 64,169,852 | | 5.46% |
| | 27,622,580 | | 2.35% |
| | 74,669,709 | | 6.36% |
| | 21,321,353 | | 1.87% |
| | 38,115,282 | | 3.24% |
| | 16,578,191 | | 1.41% |
| | 26,193,714 | | 2.23% |
| | 26,075,212 | | 2.22% |
| | 41,508,458 | | 3.53% |
| | 19,429,920 | | 1.65% |
| | 24,125,160 | | 2.05% |
| | 27,441,614 | | 2.34% |
| | 13,626,851 | | 1.16% |
| | 11,631,695 | | 0.99% |
| | 15,526,942 | | 1.32% |
| | 8,129,745 | | 0.69% |
| | 13,892,280 | | 1.18% |
| | 12,143,179 | | 1.03% |
| | 15,414,406 | | 1.31% |

Account Shorts
Reports
Directory

Morgan Stanley     Market Color Update     Wednesday, June 26, 2002 Page 1

Top Short Interest (Share Volume)    See explanations of column headings on Page 4

| Symbol | Description | Price | Sector | April Short Interest | May Short Interest | Short Interest Rate Change Indicator | Recent Trends | Start of Day Availability |
|---|---|---|---|---|---|---|---|---|
| QQQ | NASDAQ-100 SHARES | 25.5 | N/A | 146,358,432 | 164,529,696 | 12.42% | – | No | Yes |
| SPY | S & P DEPOSITORY | 97.6 | N/A | 37,430,352 | 33,079,934 | -11.62% | – | No | Yes |
| DELL | DELL COMPUTER CORP | 23.6 | Computers & Peripherals | 43,160,568 | 40,337,616 | -6.54% | – | No | Yes |
| MSFT | MICROSOFT CORP COM | 53 | Software | 48,199,528 | 45,484,892 | -5.63% | – | No | Yes |
| VRTS | VERITAS SOFTWARE | 18.7 | Software | 18,008,488 | 18,348,636 | 1.89% | – | No | Yes |
| INTC | INTEL CORP COM | 18.3 | Semiconductor Equipment & | 74,613,776 | 62,317,880 | -16.48% | – | No | Yes |
| AMAT | APPLIED MATERIALS | 19.8 | Semiconductor Equipment & | 51,021,856 | 42,615,540 | -16.48% | – | No | Yes |
| TXN | TEXAS INSTRUMENTS IN | 23.4 | Semiconductor Equipment & | 17,233,300 | 18,614,382 | 8.01% | – | No | Yes |
| SMH | SEMI CONDUCTOR | 29.8 | N/A | 11,748,836 | 10,882,934 | -7.37% | – | No | Yes |
| AMZN | AMAZON COM INC | 15.3 | Internet & Catalog Retail | 41,063,488 | 43,286,520 | 5.41% | – | No | Yes |
| QCOM | QUALCOMM INC | 26.4 | Communications Equipment | 15,183,035 | 18,605,604 | 22.54% | – | No | Yes |
| EP | EL PASO ENERGY | 20.2 | Gas Utilities | 11,896,269 | 13,224,589 | 11.17% | – | No | Yes |
| XRX | XEROX CORP | 7.81 | Office Electronics | 64,689,552 | 71,855,744 | 11.08% | – | No | Yes |
| AMGN | AMGEN INC USD.0001 | 40.7 | Biotechnology | 31,961,056 | 32,647,136 | 2.15% | – | No | Yes |
| MXIM | MAXIM INTEGRATED | 35.9 | Semiconductor Equipment & | 9,109,868 | 7,911,128 | -13.16% | – | No | Yes |
| XLNX | XILINX INC | 23.2 | Semiconductor Equipment & | 11,053,760 | 11,741,643 | 6.22% | – | No | Yes |
| LLTC | LINEAR TECHNOLOGY CO | 28.6 | Semiconductor Equipment & | 5,547,519 | 4,833,402 | -12.87% | – | No | Yes |
| AGRA | AGERE SYSTEMS INC | 1.92 | Semiconductor Equipment & | 1,992,249 | 5,595,850 | 181.00% | – | No | Yes |
| PSFT | PEOPLESOFT INC | 15.6 | Software | 8,556,606 | 9,756,761 | 14.03% | – | No | Yes |
| NXTL | NEXTEL | 3.32 | Wireless Telecommunicatio | 79,543,568 | 92,478,968 | 16.26% | – | No | Yes |
| BRCD | BROCADE | 18.3 | Communications Equipment | 20,734,320 | 18,288,712 | -11.79% | – | No | Yes |
| MOT | MOTOROLA INC COM | 14.3 | Communications Equipment | 51,313,576 | 54,504,028 | 6.22% | – | No | Yes |
| KLAC | KLA-TENCOR CORP | 43.4 | Semiconductor Equipment & | 13,273,713 | 11,299,527 | -14.87% | – | No | Yes |
| OIH | OIL SVC HOLDRS | 64.9 | N/A | 4,533,182 | 6,163,827 | 35.97% | ↓ | No | Yes |
| RNWK | REALNETWORKS INC | 4.47 | Internet Software & Servi | 1,644,177 | 1,831,545 | 11.40% | – | No | Yes |

Top Cusips by Strategy (Share Volume)

| Symbol | Description | Price | Sector | April Short Interest | May Short Interest | Short Interest Rate Change Indicator | Recent Trends | Start of Day Availability |
|---|---|---|---|---|---|---|---|---|
| ADR | | | | | | | | |
| ERICY | ERICSSON LM TEL CO | 1.51 | Communications Equipment | 25,637,676 | 12,597,090 | -50.86% | – | No | Yes |
| AZN | ASTRAZENECA PLC | 39.8 | Pharmaceuticals | 2,196,770 | 3,027,390 | 37.81% | – | No | Yes |
| NOK | NOKIA CORP | 12.4 | Communications Equipment | 21,563,288 | 14,016,472 | -35.00% | – | No | Yes |
| ALA | ALCATEL SA | 8.55 | Communications Equipment | 7,299,258 | 7,830,014 | 7.27% | – | No | Yes |
| BOBJ | BUSINESS OBJECTS | 23.6 | Software | 2,826,062 | 2,260,151 | -20.02% | – | No | Yes |
| CONVERTIBLE ARBITRAGE | | | | | | | | |
| AGRA | AGERE SYSTEMS INC | 1.92 | Semiconductor Equipment & | 1,992,249 | 5,595,850 | 181.00% | – | No | Yes |
| CPN | CALPINE CORP | 6.45 | Multi-Utilities & Unrequ | 75,728,816 | 57,806,524 | -23.67% | – | No | Yes |
| NT | NORTEL NETWORKS CORP | 1.61 | Communications Equipment | 177,096,608 | 133,297,352 | -24.73% | – | No | Yes |
| EXTR | EXTREME NETWORKS INC | 8.42 | Communications Equipment | 6,600,477 | 7,675,749 | 16.29% | – | No | Yes |
| CEPH | CEPHALON INC | 43.4 | Biotechnology | 8,313,944 | 9,466,612 | 13.86% | – | No | Yes |
| DIRECTIONAL | | | | | | | | |
| DELL | DELL COMPUTER CORP | 23.6 | Computers & Peripherals | 43,160,568 | 40,337,616 | -6.54% | – | No | Yes |
| MSFT | MICROSOFT CORP COM | 53 | Software | 48,199,528 | 45,484,892 | -5.63% | – | No | Yes |
| VRTS | VERITAS SOFTWARE | 18.7 | Software | 18,008,488 | 18,348,636 | 1.89% | – | No | Yes |
| INTC | INTEL CORP COM | 18.3 | Semiconductor Equipment & | 74,613,776 | 62,317,880 | -16.48% | – | No | Yes |
| AMAT | APPLIED MATERIALS | 19.8 | Semiconductor Equipment & | 51,021,856 | 42,615,540 | -16.48% | – | No | Yes |
| ETF | | | | | | | | |
| QQQ | NASDAQ-100 SHARES | 25.5 | N/A | 146,358,432 | 164,529,696 | 12.42% | – | No | Yes |
| SPY | S & P DEPOSITORY | 97.6 | N/A | 37,430,352 | 33,079,934 | -11.62% | – | No | Yes |
| SMH | SEMI CONDUCTOR | 29.8 | N/A | 11,748,836 | 10,882,934 | -7.37% | – | No | Yes |
| OIH | OIL SVC HOLDRS | 64.9 | N/A | 4,533,182 | 6,163,827 | 35.97% | ↓ | No | Yes |
| DIA | DIAMONDS TRUST | 91.2 | N/A | 17,682,672 | 11,785,449 | -33.35% | ↓ | No | Yes |
| RISK ARBITRAGE | | | | | | | | |
| AMGN | AMGEN INC USD.0001 | 40.7 | Biotechnology | 31,961,056 | 32,647,136 | 2.15% | – | No | Yes |
| IMNX | IMMUNEX CORP NEW | 21.7 | Biotechnology | 8,362,155 | 7,181,845 | -14.11% | – | No | Yes |
| CMCS | COMCAST CORP | 24.2 | Media | 46,071,720 | 51,081,624 | 10.87% | – | No | Yes |
| C | CITIGROUP INC | 39.1 | Diversified Financials | 37,187,276 | 26,838,054 | -27.83% | – | No | Yes |
| GMH | GENERAL MOTORS | 10.2 | Media | 4,285,664 | 2,734,099 | -36.20% | – | No | Yes |

FIG. 12

CONFIDENTIAL - FOR INTENDED RECIPIENT ONLY

MorganStanley — Market Color Update — Wednesday, June 26, 2002 Page 2

Portfolio Summary (Share Volume)
See explanations of column headings on Page 4

| Symbol | Description | Price | Sector | April Short Interest | May Short Interest | Short Interest Change | Rate MO/Type | Recall Trends | Start of Day Availability |
|---|---|---|---|---|---|---|---|---|---|
| QQQ | NASDAQ-100 SHARES | 25.5 | N/A | 146,358,432 | 164,529,696 | 12.42% | – C | No | Yes |
| DELL | DELL COMPUTER CORP | 23.6 | Computers & Peripherals | 43,160,568 | 40,337,616 | -6.54% | – C | No | Yes |
| VRTS | VERITAS SOFTWARE | 18.7 | Software | 18,008,488 | 18,348,636 | 1.89% | – C | No | Yes |
| INTC | INTEL CORP COM | 18.3 | Semiconductor Equipment & | 74,613,776 | 62,317,880 | -16.48% | – C | No | Yes |
| QCOM | QUALCOMM INC | 26.4 | Communications Equipment | 15,183,035 | 18,605,604 | 22.54% | – C | No | Yes |
| MXIM | MAXIM INTEGRATED | 35.9 | Semiconductor Equipment & | 9,109,868 | 7,911,128 | -13.16% | – C | No | Yes |
| NXTL | NEXTEL | 3.32 | Wireless Telecommunicatio | 79,543,568 | 92,478,968 | 16.26% | – C | No | Yes |
| MOT | MOTOROLA INC COM | 14.3 | Communications Equipment | 51,313,576 | 54,504,028 | 6.22% | – C | No | Yes |
| JNPR | JUNIPER NETWORKS | 6.29 | Communications Equipment | 25,482,068 | 29,071,878 | 14.09% | – C | No | Yes |
| QLGC | QLOGIC CORP | 37.5 | Semiconductor Equipment & | 10,436,174 | 13,157,405 | 26.07% | – C | No | Yes |
| MERQ | MERCURY INTERACTIVE | 24.4 | Software | 8,002,517 | 10,728,405 | 34.06% | – C | No | Yes |
| IBM | INTL BUSINESS MACHS | 68.6 | Computers & Peripherals | 28,536,762 | 21,610,336 | -24.27% | – C | No | Yes |
| CMCS | COMCAST CORP | 24.2 | Media | 46,071,720 | 51,081,624 | 10.87% | – C | No | Yes |
| FBF | FLEET BOSTON | 31.4 | Banks | 9,935,456 | 10,524,855 | 5.93% | – C | No | Yes |
| ALTR | ALTERA CORP | 13.7 | Semiconductor Equipment & | 14,049,771 | 13,242,717 | -5.74% | – C | No | Yes |
| GMH | GENERAL MOTORS | 10.2 | Media | 4,285,664 | 2,734,099 | -36.20% | – C | No | Yes |
| ESST | ESS TECHNOLOGY INC | 16.2 | Semiconductor Equipment & | 12,458,477 | 16,319,899 | 30.99% | – H | No | No |
| EBAY | EBAY INC | 60.3 | Internet & Catalog Retail | 12,844,036 | 12,750,222 | -0.73% | – C | No | Yes |
| SLAB | SILICON LABORATORIES | 23.2 | Semiconductor Equipment & | 2,241,922 | 4,052,502 | 80.76% | – H | No | Yes |
| PMCS | PMC SIERRA INC | 9.18 | Semiconductor Equipment & | 17,891,332 | 18,596,968 | 3.94% | – C | No | Yes |
| HI | HOUSEHOLD INTL CORP | 49 | Diversified Financials | 10,730,774 | 12,885,708 | 20.08% | – C | No | Yes |
| SFA | SCIENTIFIC-ATLANTA | 16.5 | Communications Equipment | 9,395,826 | 11,521,862 | 22.63% | – C | No | Yes |
| TER | TERADYNE INC | 23.8 | Semiconductor Equipment & | 15,429,151 | 12,059,997 | -21.84% | – C | No | Yes |
| ACF | AMERICREDIT CORP | 26.1 | Diversified Financials | 20,188,204 | 17,679,088 | -12.43% | – C | No | Yes |
| EDS | ELECTRONIC DATA SYS | 46.6 | IT Consulting & Services | 12,942,218 | 13,852,342 | 7.03% | – C | No | Yes |
| COF | CAPITAL ONE FINL | 57.6 | Diversified Financials | 10,114,189 | 12,013,949 | 18.78% | – C | No | Yes |
| PER | PEROT SYSTEMS CORP | 11.9 | IT Consulting & Services | 1,397,087 | 1,581,093 | 13.17% | – C | No | Yes |
| TMPW | TMP WORLDWIDE | 23.0 | Media | 10,972,250 | 10,386,556 | -5.34% | – C | No | Yes |
| GS | GOLDMAN SACHS GROUP | 71.4 | Diversified Financials | 7,409,485 | 5,894,897 | -20.44% | – C | No | Yes |
| VRSN | VERISIGN INC | 7.65 | Internet Software & Servi | 17,723,172 | 21,973,384 | 23.98% | – C | No | Yes |
| ISIL | INTERSIL CORP | 19.6 | Semiconductor Equipment & | 9,091,680 | 11,400,304 | 25.39% | – C | No | Yes |
| RIMM | RESEARCH IN MOTION | 11.4 | Communications Equipment | 10,554,852 | 12,018,424 | 13.87% | – H | No | Yes |

Top 25 Sectors (Market Value)

| Sector | Client | Outstanding MS Shorts | Recent Activity |
|---|---|---|---|
| Semiconductors | 4.94% | 8.77% | 16.26% |
| Systems Software | 1.62% | 3.54% | 7.63% |
| Biotechnology | | 7.84% | 7.27% |
| Semiconductor Equipme | 4.69% | 5.01% | 5.90% |
| Computer Hardware | 19.49% | 3.01% | 5.82% |
| Diversified Financial Ser | 5.90% | 5.60% | 5.37% |
| Pharmaceuticals | | 7.95% | 4.56% |
| Application Software | 8.86% | 5.48% | 4.19% |
| Telecommunications Equ | 7.24% | 4.40% | 3.70% |
| Banks | 4.31% | 6.73% | 3.50% |
| Broadcasting & Cable TV | 3.23% | 3.39% | 3.42% |
| Health Care Distributors | | 4.96% | 3.27% |
| Consumer Finance | 16.65% | 2.83% | 2.79% |
| Automobile Manufacturer | | 3.07% | 2.57% |
| Electric Utilities | | 3.84% | 2.45% |
| Internet Retail | 6.90% | 1.43% | 2.37% |
| Aerospace & Defense | | 2.55% | 2.30% |
| Oil & Gas Equipment & | | 2.47% | 2.30% |
| Homebuilding | 0.01% | 1.44% | 2.22% |
| Industrial Machinery | | 2.16% | 2.17% |
| Networking Equipment | 3.20% | 2.22% | 2.08% |
| Health Care Equipment | 0.01% | 3.25% | 2.08% |
| Managed Health Care | 0.79% | 2.07% | 1.95% |
| Integrated Telecommuni | 1.35% | 3.13% | 1.91% |
| Internet Software & Servi | 10.80% | 2.86% | 1.91% |

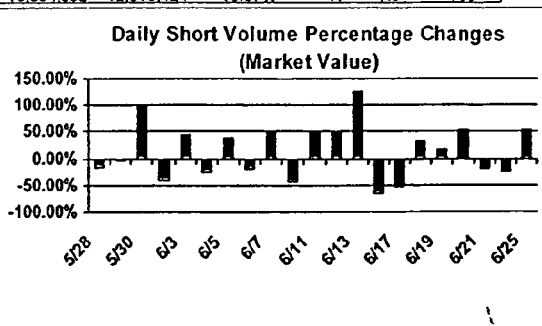

Daily Short Volume Percentage Changes (Market Value)

53.32% Change from prior trading day

FIG. 13

CONFIDENTIAL - FOR INTENDED RECIPIENT ONLY

US 7,567,935 B2

SHORT TRADE INFORMATION SYSTEM

BACKGROUND

The following invention relates to a method and system for aggregating and distributing short-sale trading information.

Short selling is a trading strategy often used to profit from an anticipated decline in the price of a stock or commodity. In a short sale, an investor sells borrowed securities hoping to buy back the securities at a lower price and make a profit. For instance, an investor desiring to short-sell 100 shares of XYZ instructs a broker to sell 100 shares of XYZ. The broker then borrows the 100 shares of XYZ stock so that the shares can be delivered to the buyer. The investor then typically tries to "cover" the short sale by buying the same amount of stock that was borrowed for return to the lender. If the investor is able to buy the 100 shares at a lower price than they were previously sold, the investor earns a profit that is the difference between the two prices. If, however, the investor has to pay more for the stock than was received in the previous sale, then the investor incurs a loss equal to the difference between the sale price and purchase price.

It is generally advantageous for investors to know the total number of shares sold short (i.e., short interest) in a particular security. For example, a stock having a large short interest outstanding may indicate that the stock will experience a negative return. In some cases, however, a large short-interest may be a "bullish" signal because it represents a latent demand for the stock that will eventually result in actual purchases of the stock by investors covering their short positions. Thus, an investor will be better equipped to make an investment decision with respect to a particular stock if the investor knows the short interest in the stock.

Short interest information for stocks is traditionally available in limited form to investors from various sources. For example, financial newspapers, such as the Wall Street Journal, print short interest on a monthly basis for stocks on different stock exchanges (e.g., the New York Stock Exchange, NASDAQ and AMEX). The short interest information published typically includes the stocks having the largest short position and the stocks having the greatest change in short position from the previous month. Because the short interest information published in financial newspapers is only updated monthly, such information is not usually sufficiently timely to be of help to a trader in making a trading decision.

Short interest information is also directly published by various stock exchanges. For example, the Hong Kong Stock Exchange publishes on a daily basis the number of shares shorted for a particular stock, the value of the total number of shorted shares and the percent of short sales relative to the total turnover for the particular stock. The Australian Stock Exchange publishes short-sale information in real-time for stocks traded on the exchange.

Although the short information published by the Hong Kong Stock Exchange and the Australian Stock Exchange is more timely than the information that is typically offered in the United States, such information is still of limited value to short-selling investors. First, the information published by these exchanges does not easily help the investor identify short trends in the market. Also lacking is any indication regarding the availability of stock to borrow in order to facilitate a short sale. The exchanges also do not provide short information according to sectors (e.g., technology and healthcare sectors).

Another drawback with respect to the type of short information these exchanges publish is that the information provided may inadvertently disclose a particular investor's short position where that one investor has a large concentration or a disproportionate percentage of the shares shorted for a particular stock. As a result, by reporting the short information for that stock, the exchange may be placing that particular investor at a disadvantage.

Given the above, investors and traders are at a significant disadvantage due to the lack of transactional information on the "sell side" of the market.

Accordingly, it is desirable to provide a system and method for aggregating and distributing short-sale transaction information.

SUMMARY OF THE INVENTION

The present invention is directed to overcoming the drawbacks of the prior art. Under the present invention a method is provided for presenting short-sale information associated with a plurality of securities and includes the steps of receiving the short-sale information from at least one source; filtering the short-sale information and presenting the filtered short-sale information according to at least one display criteria.

In an exemplary embodiment, the plurality of securities include at least one security contained in the group including equities, trading strategies, exchange traded funds and debt instruments.

In an exemplary embodiment, the short-sale information includes an amount of short interest in at least one of the plurality of securities.

In an exemplary embodiment, the short-sale information includes rate indicator information pertaining to at least one of the plurality of securities.

In an exemplary embodiment, the short-sale information includes recall trend information pertaining to at least one of the plurality of securities.

In an exemplary embodiment, the short-sale information includes availability information pertaining to at least one of the plurality of securities.

In an exemplary embodiment, the short-sale information includes temperature information pertaining to at least one of the plurality of securities.

In an exemplary embodiment, the step of filtering the short-sale information includes the step of removing at least a portion of the short-sale information associated with any of the plurality of securities if the at least a portion of the short sale information is attributable to less than a minimum number of entities.

In an exemplary embodiment, the minimum number of entities is in the range of 2 to 20.

In an exemplary embodiment, the minimum number of entities is 10.

In an exemplary embodiment, the step of filtering the short-sale information includes the step of removing at least a portion of the short-sale information associated with any of the plurality of securities if a threshold percentage of the at least a portion of the short sale information is attributable to a single entity.

In an exemplary embodiment, the threshold percentage is in the range of 20% to 80%.

In an exemplary embodiment, the threshold percentage is 60%.

In an exemplary embodiment, the step of filtering the short-sale information includes the step of removing at least a portion of the short-sale information associated with any of the plurality of securities if a threshold percentage of the at least a portion of the short sale information is attributable to a single entity.

In an exemplary embodiment, the minimum number of entities is in the range of 2 to 20 and the threshold percentage is in the range of 20% to 80%.

In an exemplary embodiment, the at least one display criteria includes by sector.

In an exemplary embodiment, the at least one display criteria includes by largest position.

In an exemplary embodiment, the at least one display criteria includes by largest increase.

In an exemplary embodiment, the at least one display criteria is selected from the group including by rate indicator, by recall trend, by unsettled interest amount, by settled interest amount, by client portfolio, by index and by temperature information.

Under the present invention, a system for presenting short-sale information associated with a plurality of securities is provided and includes a short-sale trade information database for receiving the short-sale information from at least one source. Also included is a filtering engine in communication with the information database that is used for filtering out substantially disproportionate client short-sale information. Finally, the filtered short-sale information is presented according to at least one display criteria.

In an exemplary embodiment, the filtering engine removes at least a portion of the short-sale information associated with any of the plurality of securities if the at least a portion of the short sale information is attributable to less than a minimum number of entities.

In an exemplary embodiment, the filtering engine removes at least a portion of the short-sale information associated with any of the plurality of securities if a threshold percentage of the at least a portion of the short sale information is attributable to a single entity.

In an exemplary embodiment, a client access device is included and said filtered short-sale information is presented to said client access device.

Accordingly, a method and system is provided for aggregating and distributing short-sale transaction information.

The invention accordingly comprises the features of construction, combination of elements and arrangement of parts that will be exemplified in the following detailed disclosure, and the scope of the invention will be indicated in the claims. Other features and advantages of the invention will be apparent from the description, the drawings and the claims.

DESCRIPTION OF THE DRAWINGS

For a fuller understanding of the invention, reference is made to the following description taken in conjunction with the accompanying drawings, in which:

FIG. 2 is a screenshot in which short balances associated with securities included in a particular client portfolio is displayed;

FIG. 3 is a screenshot in which pending short information associated with securities included in a particular index is displayed;

FIG. 4 is a screenshot in which the short interest information displayed is filtered by index, sector and date;

FIG. 5 is shown a screenshot in which short interest information is displayed by sector;

FIG. 6 is a screenshot in which detailed sector short interest information is displayed;

FIG. 7 is a screenshot in which sector breakdown information is displayed for a particular client account;

FIG. 8 is a screenshot that displays the buy & sell shares for each security;

FIG. 12 is a report summarizing the overall short interest in various markets; and FIG. 13 is a summary report of a particular client's portfolio.

DETAILED DESCRIPTION OF THE PREFERRED EMBODIMENTS

Figure 1:
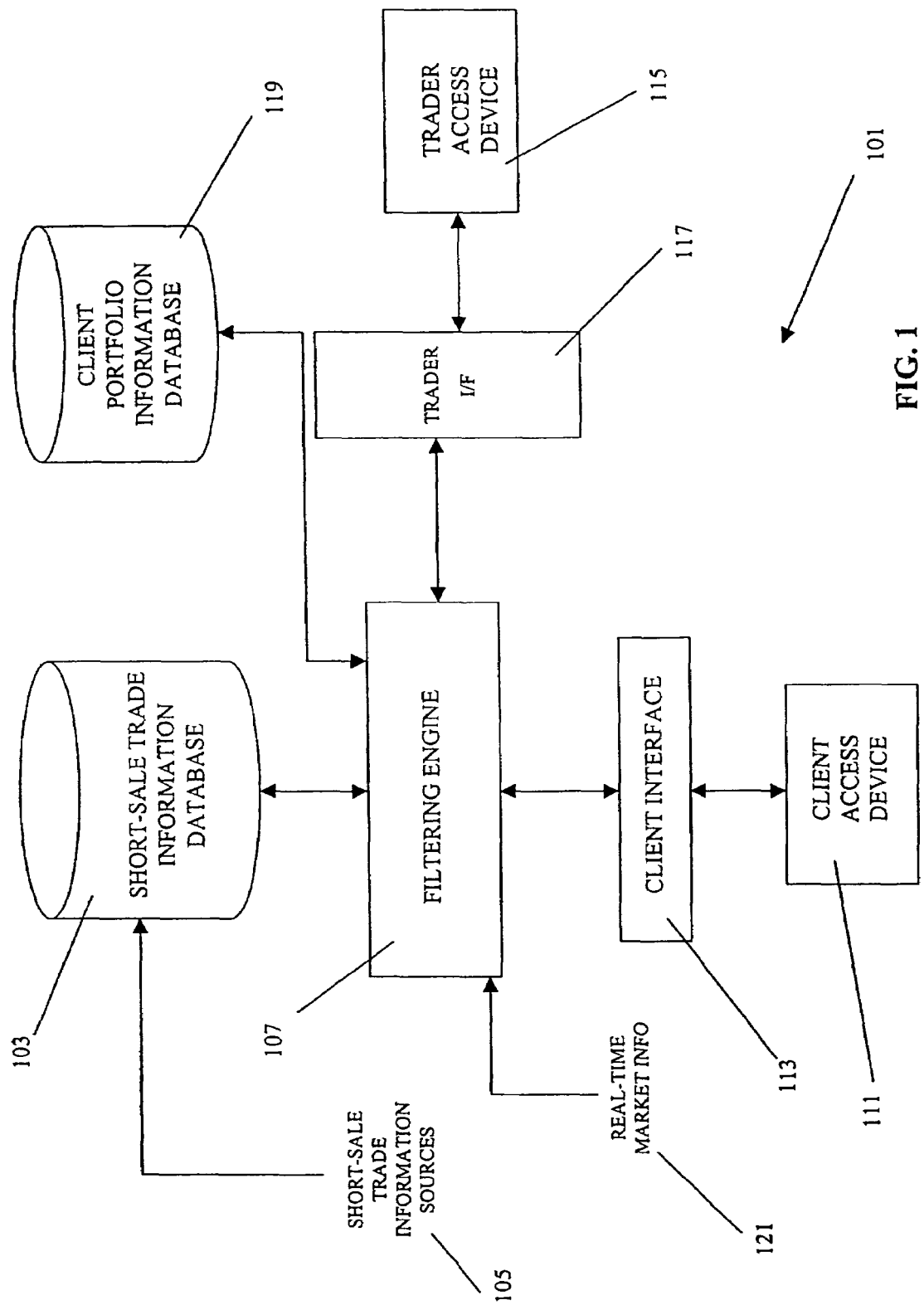
FIG. 1 is a block diagram of a system for aggregating and distributing short-sale transaction information according to the present invention.

Referring now to FIG. 1, there is shown a block diagram of a system 101 for aggregating and distributing short-sale transaction information according to the present invention. System 101 may be operated by a financial institution (e.g., a brokerage firm or exchange) desiring to aggregate short-sale trade information and provide the information to its clients and/or traders as an aid in their investment research and decision-making process. System 101 may be constructed using any suitable computer hardware (such as, for example, a personal computer) executing appropriate software for implementing the functions to be described below.

System 101 includes a short-sale trade information database 103 that stores short-sale trade information received from short-sale trade information sources 105. The short-sale trade information may include any information relating to short-sale transactions of any type of security or traded instrument. For example, the short-sale trade information may include the amount of short interest in a particular security; the change from a previous period in the amount of short interest in a particular security; the number of short-sale trade requests received for a particular security; the number of settled short-sale trade requests for a particular security; a rate indicator for a security that indicates whether the cost for borrowing a particular security (to facilitate a short-sale) is increasing or decreasing; recall trend information that indicates whether a lender of a particular security has recalled an outstanding loan; and availability information that indicates whether a particular security is available for loan.

Also included in short-sale trade information is "temperature information" that indicates the relative difficulty and cost associated with borrowing a particular security. In an exemplary embodiment, temperature information includes four indicators—cold, warm, hot and superhot—in which cold indicates that a particular security is relatively easy to borrow (and at a relatively low cost) and in which the indicators warm, hot and superhot indicate that a particular security is progressively more difficult to borrow (and at a relatively higher cost). In an exemplary embodiment, the range of difficulty to borrow associated with each of the temperature categories are such that approximately 65% of all securities are designated as either cold, warm or hot and approximately 35% of securities are designated as superhot.

Short-sale information sources 105 may include any source of short-sale information for any security. For example, short-sale information sources 105 may include trading information generated by a financial institution that executes short-sales for its clients as well on its own behalf. This information typically includes the transaction details for each short transaction performed by the financial institution (e.g., cusip, symbol, sector, share amount and price). Short-sale information sources 105 may also include temperature information provided by traders affiliated with the financial institution. Short-sale information is aggregated for various security types and transactions including, by way of non-limiting example, equities, exchange traded funds, convertible arbitrage, risk arbitrage, American Depository Receipts (ADRs) and any other security type.

System 101 also includes a filtering engine 107 for filtering the information stored in short-sale trade information database 103 according to various criteria. When a client operating a client access device 111 requests (via a client interface 113) short-sale information pertaining to certain securities, filtering engine 107 receives the request and retrieves the relevant short-sale information from short-sale trade information database 103. For example, the client may want the total short position for XYZ stock in which case filtering engine 107 retrieves from short-sale trade information database 103 the amount of XYZ shares sold short for each short trade in XYZ stock. Prior to delivering the requested information to the client, filtering engine 107 first determines the number of unique entities (e.g., financial institution clients or the financial institution itself) on whose behalf the financial institution executed the retrieved short-sale transactions. In order that the identity of a particular client's short position not be inadvertently disclosed, filtering engine 107 does not forward the requested short-sale information for use in reports provided to the client if the short-sale information reflects short-sale transactions attributable to less than a minimum number of entities. In an exemplary embodiment, the minimum number of entities is in the range of two to twenty. In a preferred embodiment, the minimum number of entities is ten. Thus, if the short-sale information associated with short transactions in XYZ stock is attributable to three entities (e.g., three clients of the institution are responsible for all the short-sale activity in XYZ stock), then in the preferred embodiment, filtering engine 107 does not forward the XYZ short-sale information to the requesting client.

If the client has requested short-sale information for more than one security, then filtering engine 107 determines for each of the requested securities whether the short-sale trade information contained in short-sale trade information database 103 is attributable to less than the minimum number of entities. Filtering engine 107 then only forwards to the client the short-sale information associated with those securities in which the retrieved short-sale information is attributable to at least the minimum number of entities. In this way, the confidentiality associated with a short position of any one client of the financial institution is maintained.

In an exemplary embodiment, filtering engine 107 also determines the percentage of the retrieved short-sale information (e.g., total short position in XYZ stock) attributable to each entity involved in any of the corresponding transactions. In order that the identity of a particular client's short position not be inadvertently disclosed, filtering engine 107 does not forward the requested short-sale information to the requesting client if a threshold percentage of the short-sale information reflects short-sale transactions attributable to a single entity (e.g., a client of a financial institution or the financial institution itself). In an exemplary embodiment, the threshold percentage is in the range of twenty to eighty percent. In a preferred embodiment, the threshold percentage is sixty percent. Thus, if sixty-five percent of the short-sale information associated with short transactions in XYZ stock is attributable to a single entity, then in the preferred embodiment, filtering engine 107 does not forward the XYZ short-sale information to the requesting client.

System 101 may be operated by a financial institution to provide short-sale information to its clients. In addition, a trader affiliated with the financial institution may operate a trader access device 115 (e.g., a personal computer) and communicate with system 101 (via trader interface 117) for retrieving short-sale trade information. As will be described below in greater detail, short-sale information may be presented in various formats and in varying levels of detail. A financial institution may wish to provide to clients only the level of detail that is necessary for the client to make an informed investment decision while also maintaining the appropriate level of confidentiality associated with the information. On the other hand, the financial institution may provide its affiliated traders with a greater level of detailed short-sale trade information while still maintaining the necessary confidentiality. In an exemplary embodiment, the financial institution that operates system 101 may select the type of information that clients and traders may request and receive by modifying the GUI (i.e., graphical user interface) presented to the clients and traders by client interface 113 and trader interface 117, respectively.

Referring now to FIG. 2, there is shown a screenshot 201 displaying short balances associated with the securities included in a particular client portfolio based on share volume. Screenshot 201, (as with the other screenshots to be described below), may be presented by trader interface 117 to a trader operating trader access device 115 or may be presented by client interface 113 to a client operating client access device 111 (if the financial institution chooses to provide the client with detailed short-sale trade information). As described above (and as is the case with the screenshots to be described later), the short-sale information displayed in screenshot 201 is filtered, as required, by filtering engine 107. Screenshot 201 includes an account drop-down box 203 in which the particular client account portfolio is selected. When a particular client account portfolio is selected, filtering engine 107 retrieves from a client portfolio information database 119 the names of the securities (and associated information) included in the selected client portfolio for display in screenshot 201. Screenshot 201 includes fields for displaying a variety of portfolio related information including a Cusip field 205 for displaying the cusip number associated with each of the securities; a Symbol field 207 for displaying the symbol for each security; an Indicator field 209 for displaying for displaying the Cold, Warm, Hot and Superhot designation for each security; a Description field 213 for displaying the name of the issuer; a Sector field 215 for displaying the issuer's sector and a Price field 211 in which the current market price for each security is displayed. In an exemplary embodiment, filtering engine 107 receives the current market price for each security from a real-time market information source 121 for inclusion in screenshot 201.

Screenshot 201 includes fields for displaying short-sale balance information including a Pending Shares field 217 for displaying the number of shares for each security in screenshot 201 for which short sales have been executed but are not currently settled under SEC regulations; an Acct. Shares field 219 for displaying the particular customer's settled short position in the indicated security and an Aggregate Short Balance field 220 for displaying the total short balance for a particular security for the two most recent time periods (for example, two weeks ending on the day the report is run) and the percent change in the short balance between those time periods. In an exemplary embodiment, Aggregate Short Balance field 220 displays short balances for all or a portion of information sources 105 within a particular financial institution or all or a portion of short positions aggregated from multiple financial institutions. In another exemplary embodiment, Indicator field 209, Pend. Shares field 217 and the short balances displayed in field 220 are not shown to clients of the financial institution and are only shown to traders affiliated with the financial institution.

Screenshot 201 also includes a Short Balance input field 221 in which the user can change the threshold percentage change in short position to be used as a filter in displaying securities. For example, the 10% illustrated would display those securities in the client's portfolio where the financial institution has experienced an aggregate 10% increase or decrease in settled short positions over the time period indicated. Also included in screenshot 201 is an Indicator section 223 that includes a Superhot checkbox 225, a Hot checkbox 229, a Warm checkbox 227 and a Cold checkbox 231. When any of these checkboxes are selected, filtering engine 107 only presents those securities that fall within the temperature ranges associated with checkboxes 225-231 and that have met the threshold percent change indicated in input field 221. Indicator section 223 also includes a Dividend checkbox 233 that when checked results in securities for which there are pending corporate actions (e.g., pending cash or stock distributions) to be displayed. Indicator section 223 also includes an All checkbox 235 that, when checked, causes all securities meeting the threshold percentage indicated in input field 221 to be displayed.

In the embodiment contained in screenshot 201, the securities are displayed in an order sorted on the percent change between the two most recent time periods (or an alternate date range that is selected by the user). In an exemplary embodiment, a GUI mechanism is provided in which the client/trader may sort the securities based on any field contained in screenshot 201 or any other information. Furthermore, the information provided in any of the fields in screenshot 201 (as well as the screenshots to be described later) may include information representative of an absolute change (increase/decrease), a percentage change or a rate of change in the parameter represented by the particular field. The information provided in the screenshots may then be sorted (and then displayed) based on the information in any of the provided fields.

Figure 3:
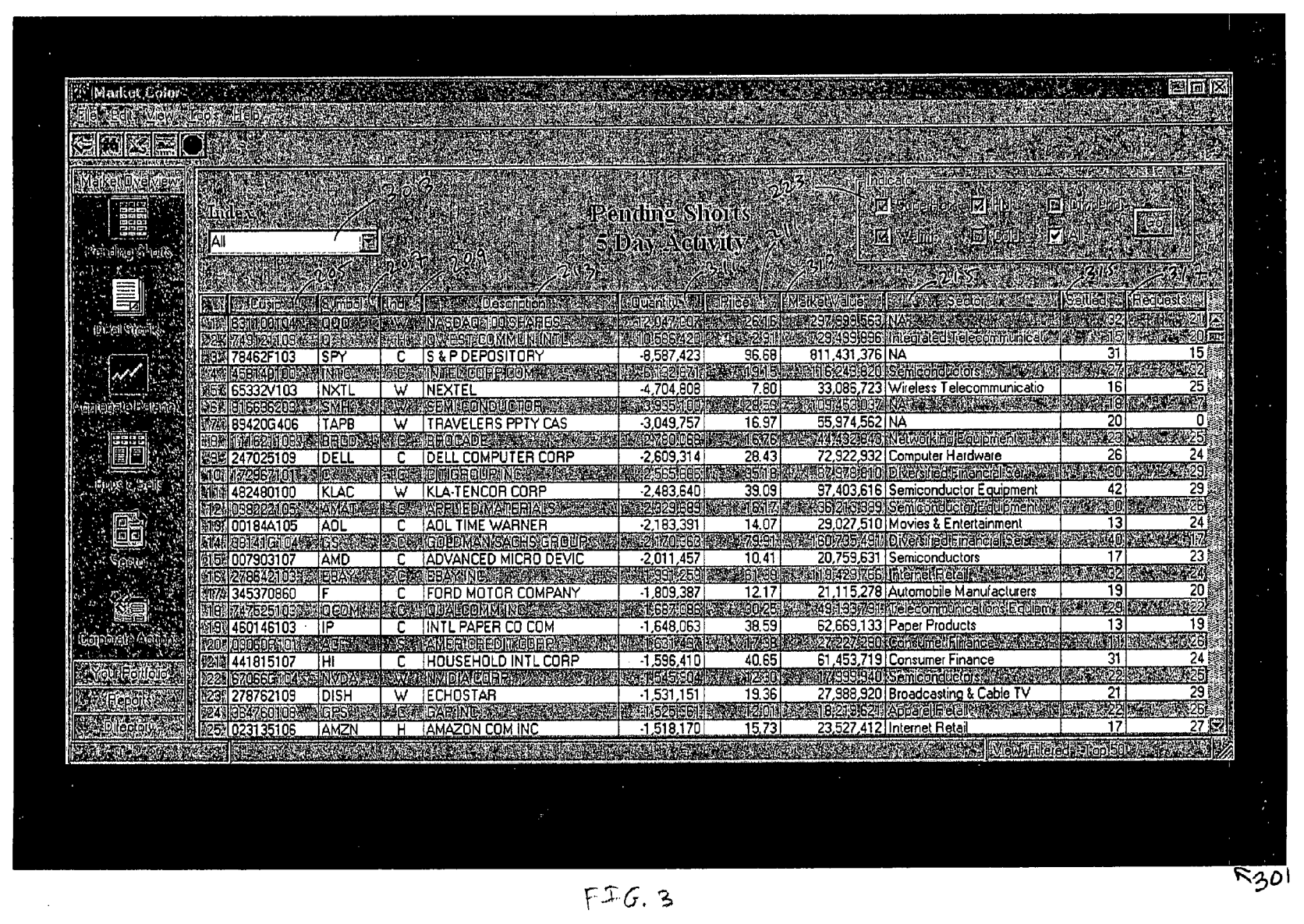

Referring now to FIG. 3, there is shown a screenshot 301 in which aggregated short trades recently executed is displayed. Screenshot 301 includes various fields that are similar to fields included in screenshot 201 such as Cusip field 205, Symbol field 207, Indicator field 209, Description field 213, Price field 211, Sector field 215 and Indicator section 223. Screenshot 301 also includes a Quantity field 311 that displays the number of shares executed as short sales during the prior five trading days, a Market Value field 313 that represents the aggregate market value of the shares that have been sold short during the prior five trading days, a Settled field 315 that displays the number of short sales that have been settled and a Requests field 317 that displays the number of pending short sale requests for the particular security. In an exemplary embodiment, Quantity field 311, Market Value field 313, Indicator field 209, Indicator box 233, Settled field 315 and Requests field 317 are not shown to clients of the financial institution and are shown only to traders affiliated with the financial institution.

Screenshot 301 also includes an Index Drop-Down box 303 in which a particular index (e.g., the S&P 500, the DJIA, the Russell 2000, the NASDAQ 100 or any other index) is selected that is used as a filter for the securities that are to be displayed. For example, if the S&P 500 is selected in Index Drop-Down box 303, then only those securities that are included in the S&P 500 will be displayed. In an exemplary embodiment, the pending short sale information is displayed for all securities (i.e., across all indices) when "all" is entered into Index Drop-Down box 303.

In the embodiment contained in screenshot 301, the securities are displayed in an order sorted on the amount contained in Quantity field 311. In an exemplary embodiment, a GUI mechanism is provided in which the client/trader may sort the securities based on any field contained in screenshot 301 or any other information. Additionally, in an exemplary embodiment, the user can sort the securities over any date range specified (as opposed to the default range of the five prior trading days).

Figure 4:
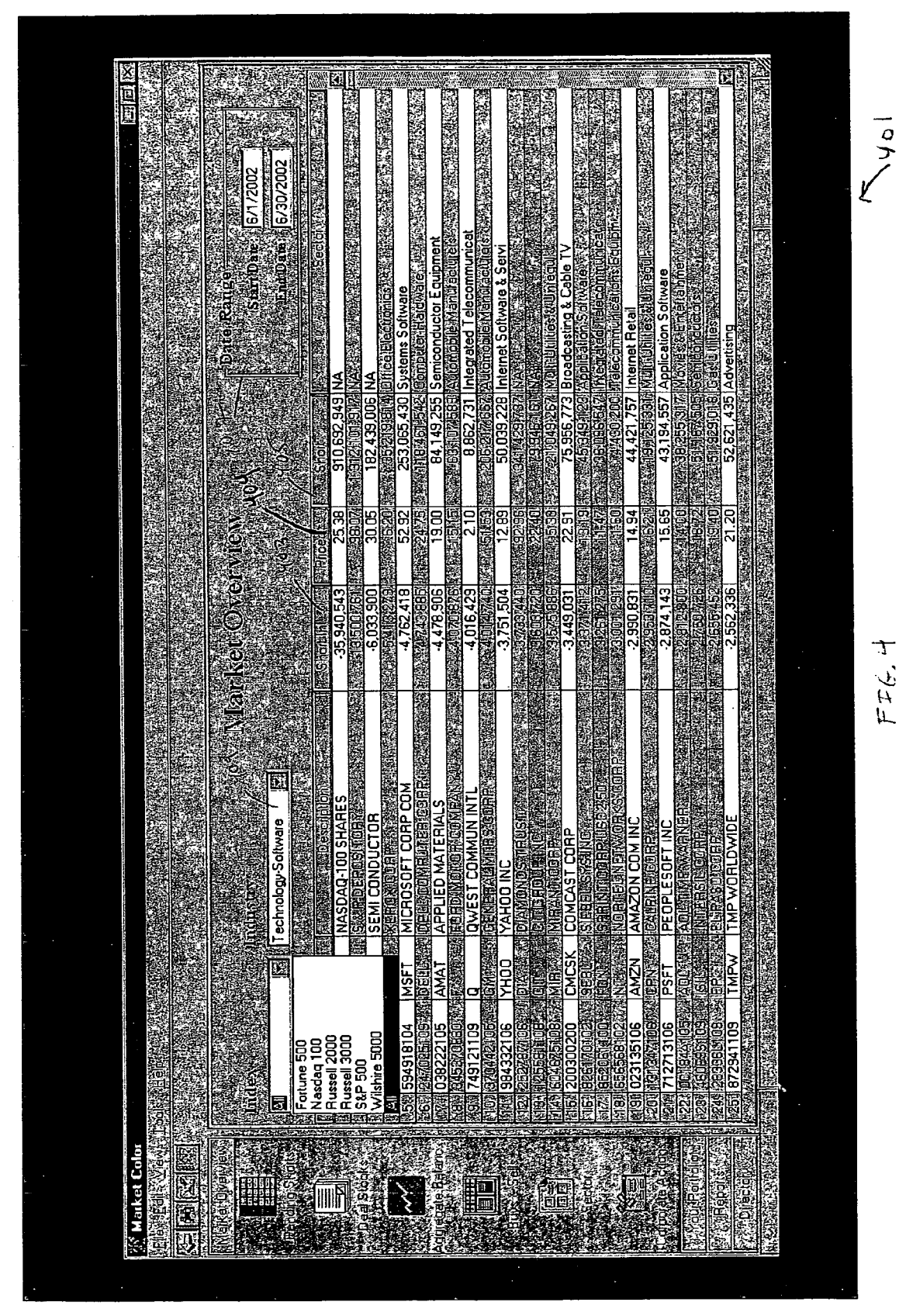

Referring now to FIG. 4, there is shown a screenshot 401 in which the short interest information displayed is filtered by index, industry and date. In addition to fields that are similar to fields that are included in screenshot 301, screenshot 401 includes a Short Int field 403 (that displays the quantity of shorted shares that have been executed), a Price field 404 (that displays the current market price of the listed security) and a Short field 405 (that displays the aggregate market value of the shorted shares that have been executed during the period indicated) for the largest securities traded short at the financial institution over a designated trading range. Screenshot 401 gives the client/trader the option of screening for such detail by index or industry subgroup. For example, screenshot 401 includes an Industry Drop-Down box 409 in which a particular industry is selected that is used as a filter for the securities to be displayed. Industries that may be selected in Industry drop-down box 409 may include, by way of non-limiting example, Financial, Media, Oil & Gas, Automotive, Utilities, Technology-Hardware, Technology-Software and Technology-Semiconductor. In an exemplary embodiment, the industries that may be selected coincide with the sector information. Alternatively, the industry selected may be broad (e.g., the computer industry) and the sector information may be more narrow (e.g., the computer hardware sector). Alternatively, any other desirable relationship between industry and sector may be used. Also included in screenshot 401 is a date range section in which a start date and an end date are entered which are used to display short interest information resulting from transactions that fall within the specified date range. In an exemplary embodiment, Short Int. field 403 and Short field 405 are not shown to clients of the financial institution and are only shown to traders affiliated with the financial institution.

In the embodiment contained in screenshot 401, the securities are displayed in an order sorted on the amount displayed in Short Int field 403. In an exemplary embodiment, a GUI mechanism is provided in which the client/trader may sort the securities based on any field contained in screenshot 401 or any other information.

Referring now to FIG. 5, there is shown a screenshot 501 in which short interest information is displayed by sector. Screenshot 501 includes an industry field 503 that displays the particular industry for which short information is provided. In an exemplary embodiment, filtering engine 107 retrieves short-sale trade information from short-sale trade information database 103 and aggregates the information by industry for presentation via screenshot 501. Screenshot 501 also includes a 5-day Pending Shorts Activity field 505 that provides short sales executed at the financial institution during the last five trading days (hereinafter referred to as "pending short activity") for each sector. In particular, 5-day Pending Shorts Activity field 505 includes a Mkt Val field 505*a* that displays the market value of the 5-day pending short activity for the particular industry and a % MV field 505*b* that displays the percent of the 5-day pending short activity for all industries that the particular industry represents. Screenshot 501 also includes a Settled Shorts field 507 that provides the settled short amount for each industry. In particular, Settled Shorts field 507 includes a Mkt Val field 507*a* that displays the market value of the settled shorts for the particular industry and a % MV field 507*b* that displays the percent of the settled shorts for all industries that the particular industry represents. Likewise, Screenshot 501 includes a field 509 (Pen1) and a field 510 (Pen2) that displays the market value of securities traded short at the financial institution on the first prior trading day and on the second prior trading day, respectively. As with the pending short activity, fields 509*b* and 510*b* show the percentage that a particular sector represents of that day's total trading activity. In the embodiment contained in screenshot 501, the securities are displayed in an order sorted on the amount displayed in % MV field 505*b*. In an exemplary embodiment, a GUI mechanism is provided in which the client/trader may sort the securities based on any field contained in screenshot 501 or any other information. Further, in an exemplary embodiment, Screenshot 501 is not shown to clients of the financial institution and is only shown to traders affiliated with the financial institution.

Referring now to FIG. 6, there is shown a screenshot 601 in which detailed sector short interest information is displayed. Screenshot 601 includes a pop-up window 603 that displays detailed short information by security for any selected sector. For example, in order to see detailed information regarding the 5-day pending short activity for a particular sector, the client/trader may, for example, double-click on 5-day Pending Short Activity field 505 that corresponds to the particular sector. Similarly, to see detailed information regarding the settled short activity for a particular sector, the client/trader may double-click on Settled Shorts field 507 that corresponds to the particular sector. Pop-up window 603 provides detailed sector information that includes a Cusip field 605 that displays the cusip number for each security in the particular sector, a Symbol field 607 that displays the corresponding symbol for the security, an Indicator field 609 (that displays cold, warm, hot and superhot indicators), a Shares field 613 that displays the 5-day pending short activity amount for each security (in the particular example of FIG. 6) and a Mkt Val field 615 that displays the market value of the 5-day pending short activity for each security. In an exemplary embodiment, Shares field 613, Mkt Val field 615 and Totals field 619 are not shown to clients of the financial institution and are only shown to traders affiliated with the financial institution. Also, while a 5-day range for pending short activity is used in the above described embodiment, any other number of days may be selected for display in Pending Short Activity field 505 (as well as for any other field described herein).

Figure 7:
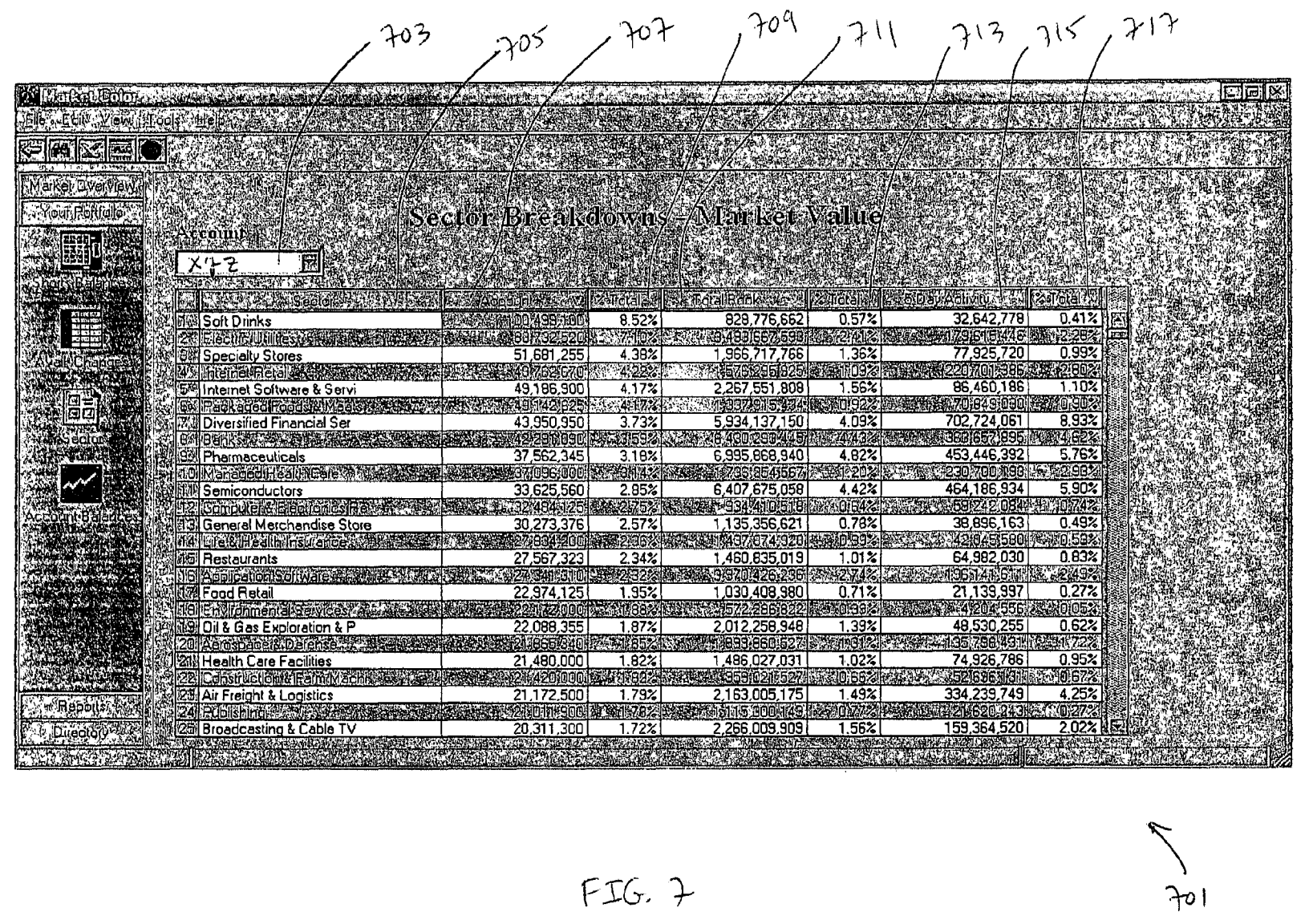

Referring now to FIG. 7, there is shown a screenshot 701 in which sector concentrations are displayed for a particular client account. Screenshot 701 includes an Account Drop-Down box 703 that identifies the particular client for which sector concentration information is desired. Screenshot 701 also includes a list of the largest 25 sectors in which the client has a short position (field 705) and which is sorted by the aggregate market value of securities in the client's account (field 707). Field 709 shows the percentage of the client's total short portfolio such sector concentrations represent. For comparison purposes, screenshot 701 also includes the aggregate market value the particular sector represents of the financial institution's settled short positions (field 711) and recent short trading activity (field 715) as well as the percentage such amounts represent of the total settled shorts (field 713) and short sales (field 717) recently executed at the financial institution, respectively. In an exemplary embodiment, Total Book field 711 and 5 Day Activity field 715 are not shown to clients of the financial institution and are only shown to traders affiliated with the financial institution.

Figure 8:
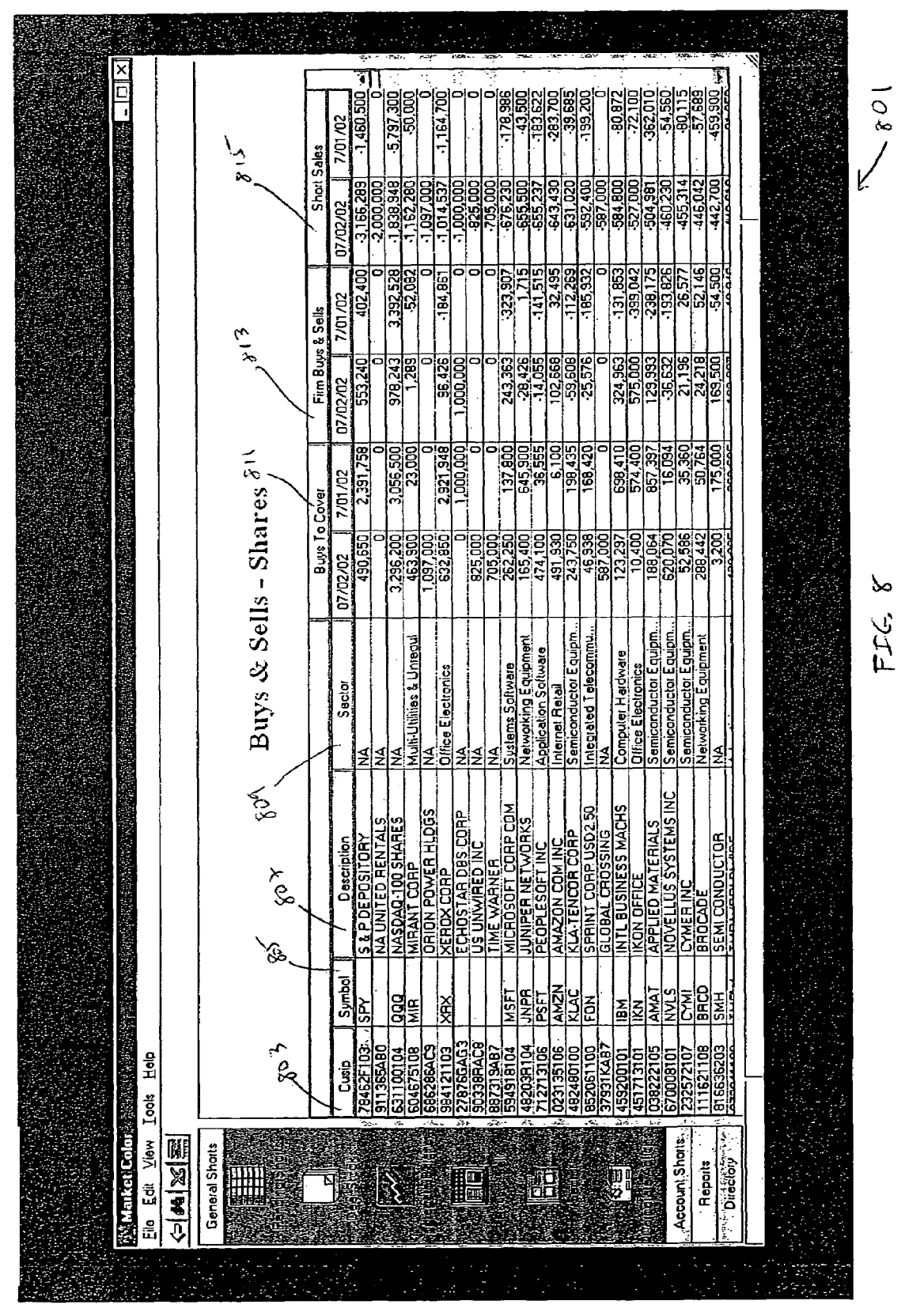

Referring now to FIG. 8, there is a screenshot 801 that displays the security with the largest trading activity over the period indicated in terms of purchases to cover outstanding short sales (e.g., short sale close outs) (field 811) proprietary trading activity (field 813) and customer trading activity (field 815). In particular, screenshot 801 includes a Cusip field 803, a Symbol field 805, a Description field 807 and a Sector field 809. Screenshot 801 displays the aforementioned information for each security for two consecutive time periods (such as, for example, two consecutive trading days). The default sort criteria for screenshot 801 is the immediately preceding trading day in field 815. In an exemplary embodiment, the user can change the sort criteria to be based on either date in date fields 811 or 813 or any other information. In an exemplary embodiment, Screenshot 801 is not shown to clients of the financial institution and is only shown to traders affiliated with the financial institution.

Figure 9:
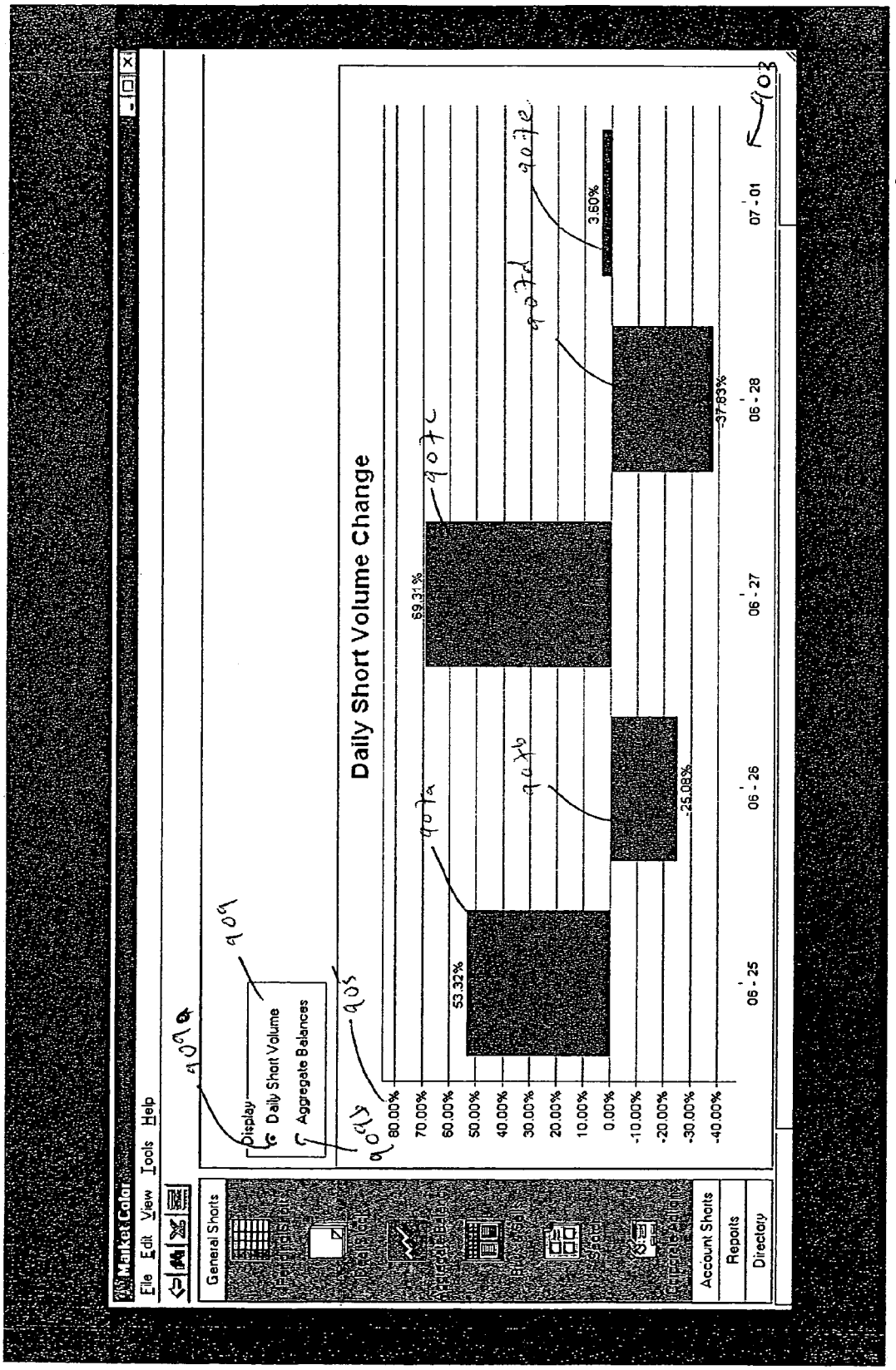
FIG. 9 is a screenshot of a bar graph depicting the daily change in short volume.

Referring now to FIG. 9, there is shown a screenshot 901 of a bar graph depicting the daily change in the total short balance for the financial institution. The x-axis 903 is broken down in time units across which the daily short volume changes are recorded. These time units may be any unit including, by way of non-limiting example, daily time units. The y-axis 905 is broken down in percent changes. Screenshot 901 also includes a display field 909 that includes a Daily Short Volume radio button 909*a* and an Aggregate Balances radio button 909*b*. If Daily Short Volume radio button 909*a* is selected, then the bar graph of screenshot 901 includes bars 907*a-e* one for each time unit and each having a size and direction that indicates the percent change in the total short interest for the particular time unit.

Figure 10:
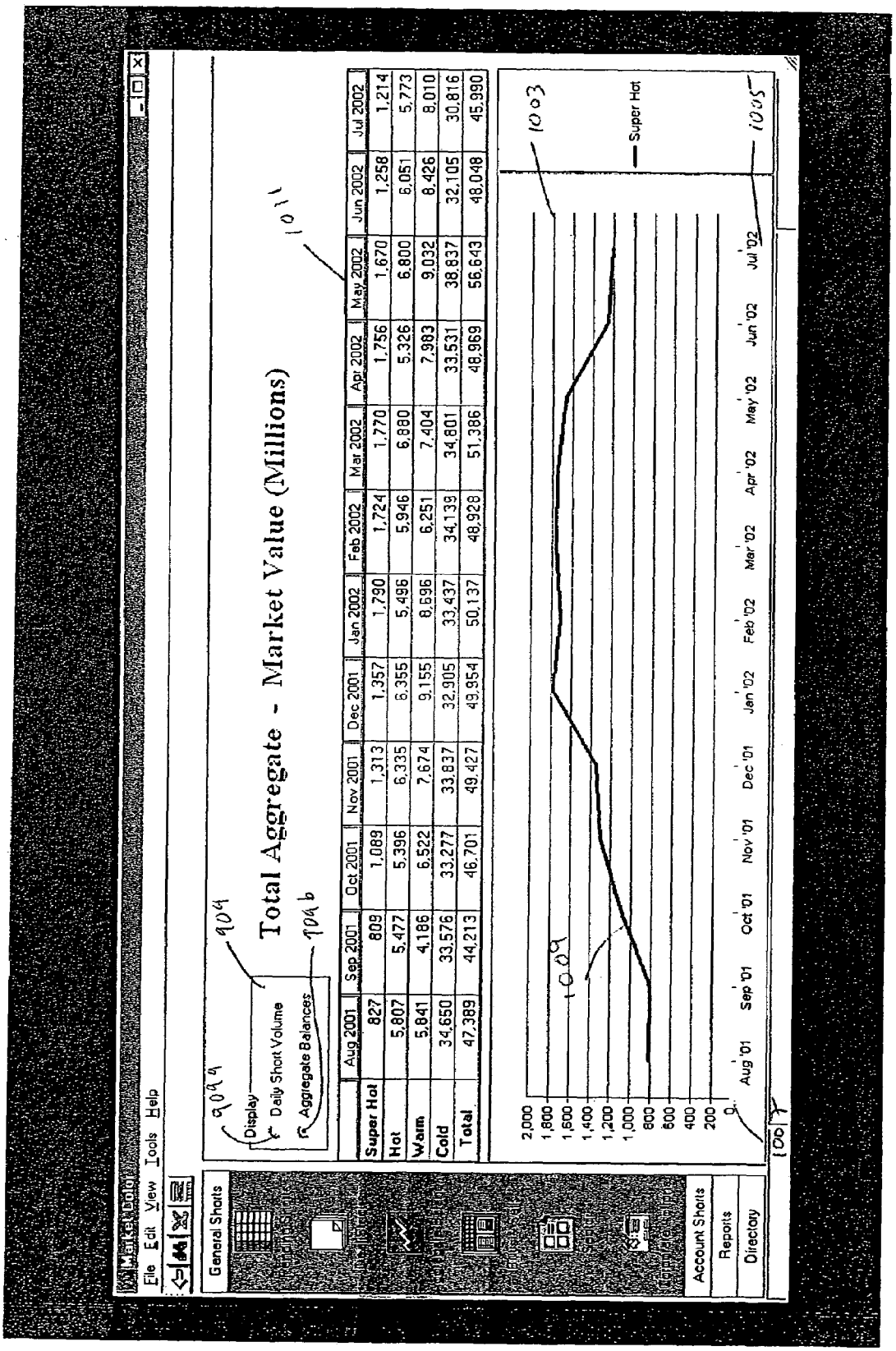
FIG. 10 is a screenshot of a graph that depicts the aggregate market value of the total short position for all securities.

Referring now to FIG. 10, there is shown a screenshot 1001 of a graph 1003 that depicts the aggregate market value of the short position for all securities. Screenshot 1001 includes aggregate balances radio button 909*b* that when selected results in graph 1003 being drawn displaying the aggregate market value of the total short position. Graph 1003 includes an x-axis 1005 having time units in months and a y-axis 1007 in units representing market value. Graph 1003 thus includes a line 1009 that traces out the aggregate market value of the total short position for all settled short positions held by the financial institution for the time units selected. In an exemplary embodiment, Screenshot 1001 is not shown to clients of the financial institution and is only shown to traders affiliated with the financial institution.

Screenshot 1001 also includes a table 1011 that shows the short market value for each constituent temperature category and the aggregate market value of outstanding settled short balances for each time unit presented. For example, for the August 2001 time period, there was a total market value of 827,000 in Superhot stocks shorts, a total of 5,807,000 Hot shorts, a total of 5,841,000 Warm shorts and a total of 34,650,000 Cold shorts. Breaking out the short market value in this manner helps a trader of the financial institution in monitoring the financial institution's short book.

Figure 11:
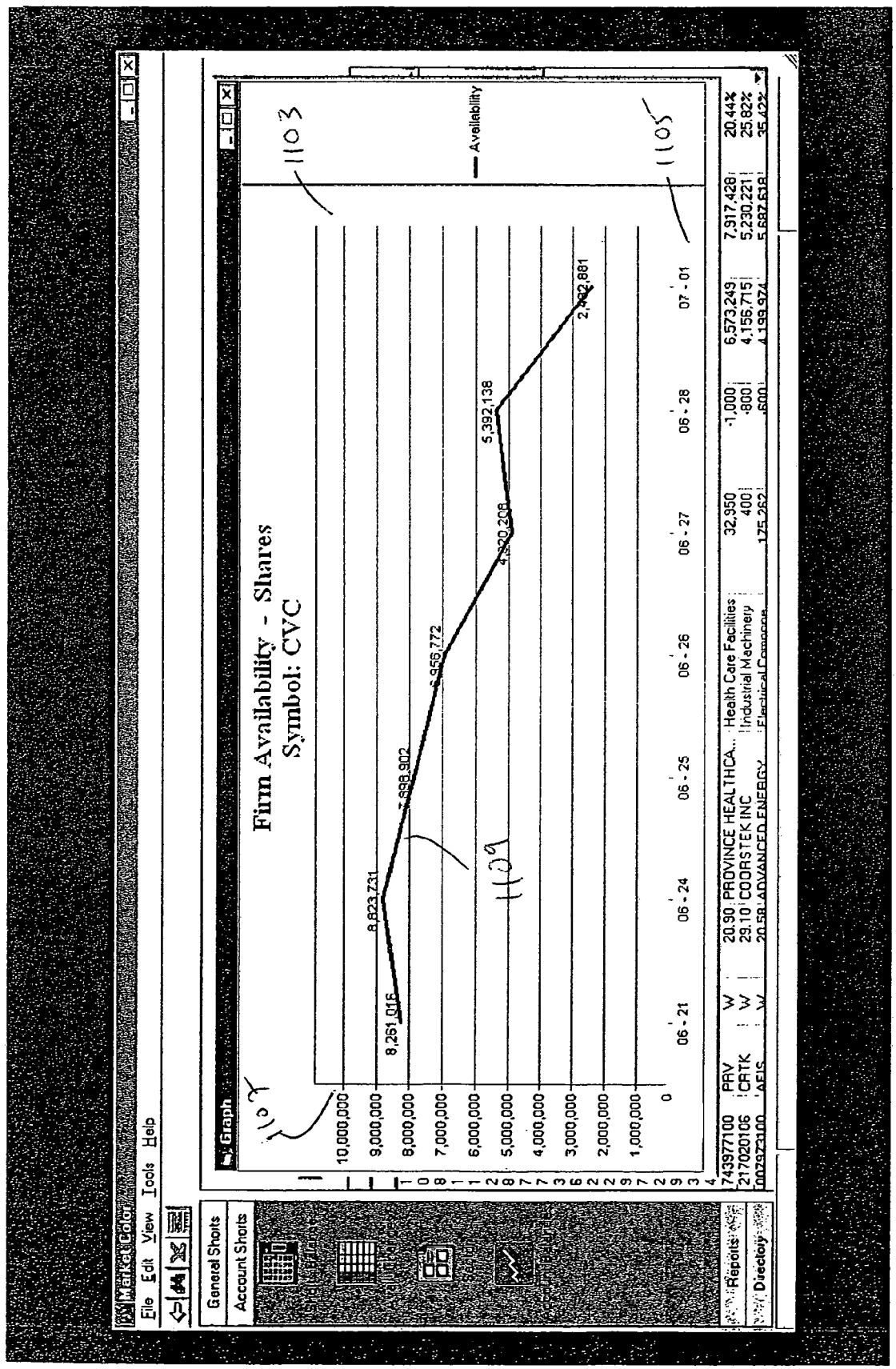
FIG. 11 is a screenshot of a graph that depicts the availability of shares for borrowing for the purpose of shorting a particular security.

Referring now to FIG. 11, there is shown a screenshot 1101 of a graph 1103 that depicts the availability of shares for borrowing for the purpose of shorting a particular security. Graph 1103 includes an x-axis 1105 in time units (in the example of FIG. 11, the time units are days), and a y-axis 1107 representing a number of shares available from a particular source. Graph 1103 includes a line 1109 that traces the availability of shares for borrowing for a selected security (in this example, Cablevision stock) over the indicated time period. In an exemplary embodiment, graph 1103 is selected by highlighting a particular security displayed in any screenshot and issuing a request for graph 1103.

Referring now to FIG. 12, there is shown a report 1201 summarizing the overall short interest in various markets that is available to select customers of the financial institution. Report 1201 includes a Top Short Interest section 1203 that lists in descending order the securities having the highest short interest over the prior 5 trading days. For each security included in Top Short Interest section 1203, report 1201 provides a Symbol 1207, a Description 1209, a Price 1211, a Sector 1213, the publicly reported short interest for the previous month (column 1215), the publicly reported short interest for the current month (column 1217), the Percent Change in the publicly reported short interest for the security over the last two months (column 1219), a Rate Indicator 1221 that indicates whether the rate to borrow the particular security for shorting is increasing (up arrow), decreasing (down arrow) or neutral (no arrow), a Recall Trend Indicator 1223 that indicates whether lenders of the particular security have recalled outstanding loans of the particular security and a Start of Day Availability indicator 1225 that indicates whether the particular security was available for borrowing at the beginning of the indicated trading day.

Report 1201 also includes a Top Cusips by Strategy section 1205 that provides similar information for the securities that have experienced the largest short interest over the prior five trading days across various trading strategies including, by way of example, American Depository Receipts, Convertible Arbitrage, Directional, ETF and Risk Arbitrage.

Referring now to FIG. 13, there is shown a summary report 1301 of a particular client's portfolio (in this example, XYZ Fund). Report 1301 includes a portfolio summary section 1303 that displays those securities in which the financial institution has experienced the largest short interest over the past five trading days, as filtered by the short positions in the client's account. Report 1301 includes a Top 25 Sector section 1305 that lists the top 25 sectors (of all sectors) based on recent short trading activity (i.e., the percent short volume the particular sector is compared to the short volume of all sectors (column 1307). Section 1305 also compares the sector concentrations occurring over the prior trading days ("Recent Activity" column 1307) against the percentage such sectors represent of the aggregate settled short balances at the financial institution ("Outstanding MS Shorts" column 1309) and the client's total short portfolio ("Client" column 1311). Finally, report 1301 includes a bar graph section 1313 that displays the daily short volume percentage changes (similar to the bar graph of FIG. 9).

Additional information may also be included in summary report 1301. For example, news stories relating to a particular heavily traded security may be included and associated with that news story may also be included short trend information or any other suitable analysis related to the particular security. In an exemplary embodiment, a rating for each listed security indicating the likelihood that the particular security would undergo a recall from the lenders of the security is provided. In a preferred embodiment, Summary Report 1301 does not provide the particular rating for each security to clients of the financial institution but rather sorts the securities listed in summary report 1301 based on this rating information.

Although a number of screenshots and reports presenting various types of short-sale information have been described, any type of screenshots and reports incorporating any type of short-sale information may be provided in accordance with the present invention. For example, other short-sale trade information may include screenshots showing the largest/smallest percentage change in securities that have been sold short at the financial institution or securities that are available for borrow, respectively, an indicator of securities that are subject to recall/buy-in (i.e., short sales subject to close out per regulation) and long positions held by customers that the financial institution may be interested in borrowing to comply with securities regulations. Additional types of short-sale trade information may also be presented in other suitable formats including, by way of non-limiting example, heatmaps, graphs and charts. The present invention may also be used to review, manipulate, sort and filter information by any security type, strategy, transaction type and/or by any column indicated in any of the screenshots described above. For example, in an exemplary embodiment, information may be filtered so that only proprietary trades (those performed on behalf of the financial institution) are displayed and are sorted by sector.

In another exemplary embodiment, real-time functionality is provided to the user including, by way of non-limiting example, real-time indications of significant activity in user-specified securities or sectors (e.g., audio or visual alerts). In addition, any type of ratio statistics based on the information aggregated using the system of the present invention may be provided to the user such as, by way of non-limiting example, the short interest ratio or the ratio of shares available to borrow for a particular security versus the short interest in the particular security.

In another exemplary embodiment, a user can configure the system of the present invention to aggregate any information about any securities (i.e., provide the system with a watch list) and receive trend analysis based thereon. The user may also request that the aggregated information be exported to an external system specified by the user for further analysis and/or manipulation. The invention may further be used to more efficiently coordinate various regulatory requirements applicable to executing short sales. For example, U.S. regulations prohibit a member of the New York Stock Exchange or National Association of Securities Dealers from selling a security short unless the broker dealer is first able to "locate" a borrowable security to cover the short. As such, in an exemplary embodiment, upon the request of the user, system 101 can be incorporated or combined into other technical systems that would allow the user to execute a "locate" function that determines that a particular security is borrowable and communicates information to the user thereby facilitating the execution of a short sale in the particular security. Additionally, the present invention may be used to assemble/accumulate statistics and data on such locate requests (e.g., the most requested "locates" for a security and real-time indicators of significant changes in locate requests).

In an exemplary embodiment, the short-sale trade information aggregated in short-sale trade information database 103 may also be used as a data source for various trading strategies that rely on short-sale information. As an example, in addition to short selling as a speculative tool for profiting on price declines, traders often short securities in order to take advantage of pricing disparities between certain securities such as differences between ADRs and the underlying ordinary stock or pricing differences between the acquiring and target companies involved in a merger or corporate action. Additionally, investors may sell securities short in order to hedge their long positions in case of a market decline or for tax related reasons. In this context, the trade information aggregated in database 103 under the present invention may be used to identify the securities that may interest market participants interested in these various trading strategies. Furthermore, the present invention may be used to aggregate and filter any information regarding any type of security, transaction and/or trading strategy such as, by way of non-limiting example, various transaction statistics and data for fixed income securities, single stock futures and derivative transactions.

Accordingly, a system and method is provided for aggregating and distributing short-sale transaction information. System 101 aggregates short-sale trade information and this information is filtered by filtering engine 107 according to certain filtering criteria. Upon receiving a request from a client and/or trader, the information is then formatted and presented in a form that is helpful to the client/trader for making investment decisions.

A number of embodiments of the present invention have been described. Nevertheless, it will be understood that various modifications may be made without departing from the spirit and scope of the invention. Based on the above description, it will be obvious to one of ordinary skill to implement the system and methods of the present invention in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Furthermore, alternate embodiments of the invention that implement the system in hardware, firmware or a combination of both hardware and software, as well as distributing modules and/or data in a different fashion will be apparent to those skilled in the art and are also within the scope of the invention. In addition, it will be obvious to one of ordinary skill to use a conventional database management system such as, by way of non-limiting example, Sybase, Oracle and DB2, as a platform for implementing the present invention. Also, network access devices can comprise a personal computer executing an operating system such as Microsoft Windows™, Unix™, or Apple Mac OS™, as well as software applications, such as a JAVA program or a web browser. Access devices 111 and 115 can also be a terminal device, a palm-type computer, mobile WEB access device or other device that can adhere to a point-to-point or network communication protocol such as the Internet protocol. Computers and network access devices can include a processor, RAM and/or ROM memory, a display capability, an input device and hard disk or other relatively permanent storage. Accordingly, other embodiments are within the scope of the following claims.

It will thus be seen that the objects set forth above, among those made apparent from the preceding description, are efficiently attained and, since certain changes may be made in carrying out the above process, in a described product, and in the construction set forth without departing from the spirit and scope of the invention, it is intended that all matter contained in the above description shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

The invention claimed is:

1. A computer-implemented method for presenting short-sale trade information associated with at least one of a plurality of securities, comprising the steps of:

receiving into a computer storage digital data comprising said short-sale trade information from at least one source, wherein said short-sale trade information includes amounts of short interest in each of said at least one of said plurality of securities;

filtering said short-sale information with a processor operatively connected to the computer storage;

wherein said filtering includes retrieving short-sale trade information associated with at least one of said plurality of securities from said computer storage;

determining, for each of said at least one of said plurality of securities, the number of unique entities to which said retrieved short-sale trade information is attributable; and determining, for each of said at least one of said plurality of securities, the amount of said retrieved short-sale trade information that is attributable to a single entity; and forwarding for presentation said short-sale trade information associated with any one or more of said plurality of securities if, for such security, at least one of: said short-sale information is attributable to more than a minimum number of unique entities, and no amount of said of said short-sale information attributable to a single entity is within a predetermined threshold amount; and presenting said filtered short-sale information.

2. The method of claim 1, wherein said plurality of securities include at least one security contained in the group including equities, trading strategies, exchange traded funds and debt instruments.

3. The method of claim 1, wherein the short-sale information includes rate indicator information pertaining to at least one of said plurality of securities.

4. The method of claim 1, wherein the short-sale information includes recall trend information pertaining to at least one of said plurality of securities.

5. The method of claim 1, wherein the short-sale information includes availability information pertaining to at least one of said plurality of securities.

6. The method of claim 1, wherein the short-sale information includes temperature information pertaining to at least one of said plurality of securities.

7. The method of claim 1, wherein said minimum number of entities is in the range of 2 to 20.

8. The method of claim 1, wherein said minimum number of entities is 10.

9. The method of claim 1, wherein said threshold amount is in the range of 20% to 80%.

10. The method of claim 1, wherein said threshold amount is in the range of 60% or greater.

11. The method of claim 1, wherein said minimum number of entities is in the range of 2 to 20 and said threshold amount is in the range of 20% to 80%.

12. The method of claim 1, wherein said step of presenting said filtered short sale information includes the step of presenting said filtered short sale information according to at least one display criteria and wherein said at least one display criteria includes by sector.

13. The method of claim 1, wherein said step of presenting said filtered short sale information includes the step of presenting said filtered short sale information according to at least one display criteria and wherein said at least one display criteria includes by largest position.

14. The method of claim 1, wherein said step of presenting said filtered short sale information includes the step of presenting said filtered short sale information according to at least one display criteria and wherein said at least one display criteria includes by largest change.

15. The method of claim 1, wherein said step of presenting said filtered short sale information includes the step of presenting said filtered short sale information according to at least one display criteria and wherein said at least one display criteria is selected from a group including by rate indicator, by recall trend, by unsettled interest amount, by settled interest amount, by client portfolio, index and by temperature information.

16. The method of claim 1, further comprising the step of:
exporting from the computer system said filtered short-sale information to an external system.

17. The method of claim 1, wherein said step of presenting said filtered short-sale information includes the step of presenting said filtered short-sale information according to at least one display criteria.

18. A computer system for presenting short-sale trade information associated with a plurality of securities, comprising:
a programmable system including at least a programmable processor; computer software executable on the programmable system; and a short-sale trade information database, the computer software operative with the processor to cause:
the information database to receive said short-sale trade information from at least one source, wherein said short-sale trade information includes amounts of short interest in each of said at least one of said plurality of securities;
a filtering engine in communication with said information database to filter said short-sale information;
wherein said filtering engine is adapted to:
retrieve short-sale trade information associated with at least one of said plurality of securities from said information database;
determine, for each of said at least one of said plurality of securities, the number of unique entities to which of said retrieved short-sale trade information is attributable; and
determining, for each of said at least one of said plurality of securities, the amount of said retrieved short-sale trade information that is attributable to a single entity; and
forward for presentation said short-sale trade information associated with any one or more of said plurality of securities if, for such security, at least one of: said short-sale information is attributable to more than a minimum number of unique entities, and no amount of said short-sale trade information is-attributable to a single entity, is within a predetermined threshold amount;
and a display device to present said filtered short-sale information.

19. The system of claim 18, wherein said plurality of securities include at least one security contained in the group including security types, trading strategies and transaction types.

20. The system of claim 18, wherein the short-sale information includes rate indicator information pertaining to at least one of said plurality of securities.

21. The system of claim 18, wherein the short-sale information includes recall trend information pertaining to at least one of said plurality of securities.

22. The system of claim 18, wherein the short-sale information includes availability information pertaining to at least one of said plurality of securities.

23. The system of claim 18, wherein the short-sale information includes temperature information pertaining to at least one of said plurality of securities.

24. The system of claim 18, wherein said minimum number of entities is in the range of 2 to 20.

25. The system of claim 18, wherein said minimum number of entities is 10.

26. The system of claim 18, wherein said threshold amount is in the range of 20% to 80%.

27. The system of claim 18, wherein said threshold amount is in the range of 60% or greater.

28. The method of claim 18, wherein said minimum number of entities is in the range of 2 to 20 and said threshold amount is in the range of 20% to 80%.

29. The system of claim 18, wherein said display device comprises a client access device.

30. The system of claim 18, further comprising an external system and wherein said filtered short-sale information is exported to said external system.

31. The system of claim 18, wherein said display device presents said filtered short-sale information according to at least one display criteria.

32. The system of claim 31, wherein said at least one display criteria includes by sector.

33. The system of claim 31, wherein said at least one display criteria includes by largest change.

34. The system of claim 31, wherein said at least one display criteria includes by largest increase.

35. The system of claim 31, wherein said at least one display criteria is selected from the group including by rate indicator, by recall trend, by unsettled interest amount, by settled interest amount, by client portfolio, by index and by temperature information.

* * * * *